April 22, 1969  J. FRIEDMAN ET AL  3,439,503

ROCKET ENGINE COOLING

Filed Jan. 25, 1966

INVENTORS.
JOSEPH FRIEDMAN
LEWIS A. GLENN
BY
Donald W. Graves
ATTORNEY 3,439,503
ROCKET ENGINE COOLING
Joseph Friedman, Encino, and Lewis A. Glenn, Northridge, Calif., assignors to North American Rockwell Corporation, a corporation of Delaware
Filed Jan. 25, 1966, Ser. No. 522,936
Int. Cl. F02k 11/02, 9/02, 11/04
U.S. Cl. 60—267                                    4 Claims

ABSTRACT OF THE DISCLOSURE

A primary cooling system for a rocket motor thrust chamber having its combustion chamber and throat portions constructed of beryllium which has excellent thermal conductivity properties. The walls of the combustion chamber and throat are sufficiently thick so that when a film of coolant fluid is injected into the combustion chamber heat paths are formed within the interior walls, extending from the throat portion axially rearwardly to a region upstream of the throat portion. Heat absorbed by the throat is conducted along the heat paths to the upstream region which acts as a heat sink and dissipates the heat.

---

Figure 1:
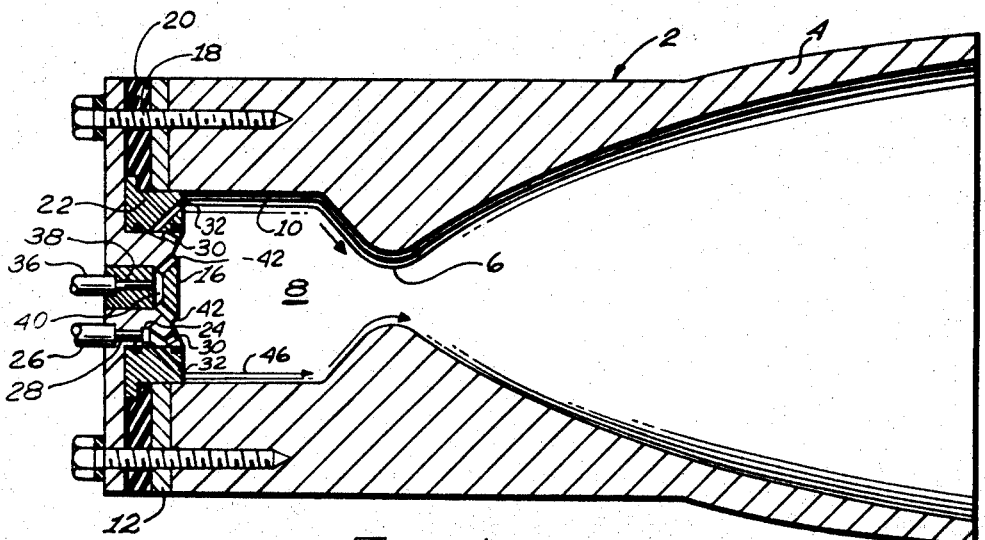

This invention relates to rocket engines.

More particularly, this invention relates to cooling of a rocket engine or the like.

In the art of building rocket engines, one of the greatest problems encountered resides in the necessity for cooling the engines, whether for short duration firings or for longer duration firings. Cooling of these engines is of extreme importance since the thrust generated is a resultant of high pressure and temperatures encountered when one or more propellants, whether liquid or solid, undergo combustion with resultant high temperatures and heat generated. The only way that this heat can be dissipated is through the nozzle exit and through the nozzle walls and injector. When this heat escapes through the nozzle walls, the walls become very hot and structural integrity is threatened. While it is possible to construct nozzle walls of materials having the capability of withstanding temperatures higher than those attained by the combustion gases, the resultant nozzle is often cumbersome, heavy, unwieldy and has other disadvantages. In any event, regardless of the material used, some heat can be transferred to other parts of the rocket engine which due to their function cannot be subjected to this heat without deleterious effects. For example, the injector itself and the propellant lines leading thereto must avoid contact with high temperatures, particularly with cryogenic propellants. It is, therefore, an ever increasing problem to provide for heat absorption or dissipation.

Many methods have been employed in the past for cooling a rocket engine. One of these is to provide insulation on the inside of the nozzle wall. This presents problems in weight as well as problems in insulation breakdown, particularly under prolonged firing conditions. Furthermore, most insulation known in the art is inadequate for the purpose.

The most common method of cooling a rocket engine in present day technology is the so-called regenerative cooling method. In this type of cooling, one of the propellant is led through tubes forming the nozzle wall and then returned to the injector for injection into the combustion chamber for ultimate combustion. Heat is absorbed by the coolant or propellant during passages through the tubes. This necessitates many tubes and high pump capacity to overcome the viscosity and friction head losses encountered due to the long traversal of the propellant through the tubes which is typically equal to twice the length of the rocket engine.

Another common means of cooling a rocket engine is the employment of the so-called dump cooling process. In this process a coolant such as liquid hydrogen is introduced either into an annulus or tubes surrounding the combustion chamber. As it passes toward the exit plane of the nozzle, it will absorb heat which causes an expansion to occur which when harnessed through a nozzle will add to the specific impulse of the engine. In this case, however, complicated structure is utilized and it is useful primarily only with hydrogen. An example of this is disclosed in U.S. patent application, Serial No. 266,445, filed on March 19, 1963, now Patent No. 3,267,664, assigned to the assignee of this invention.

Another method of cooling resides in the introduction of thin film of coolant, typically one of the propellants adjacent to the inner wall of the combustion chamber. This provides a boundary layer for heat transfer from the combustion process to the liquid film and thus prevents some of the heat from being transferred to the combustion chamber and nozzle wall. However, in prior art examples, the nozzle wall still absorbs a portion of the heat which must be dissipated in some manner.

Another method of cooling a rocket engine resides in providing a very thin walled nozzle so that heat transfer from the combustion chamber through the nozzle wall is radiated into space. This method suffers the disadvantage of necessitating a thin walled chamber running at very high temperatures which inherently has less strength than the thicker walled chambers and is thus subject to pressure spikes and other combustion instability problems which may result in destruction of the engines. Also, clustering of these engines is difficult to obtain because of the confinement of radiating surfaces in juxtaposed position to each other.

With the use of smaller engines, an advantageous method of cooling is through the use of ablative materials on the interior of the nozzle walls. During firing, ablation occurs which is a chemical reaction causing a charring of the ablative material with a concomitant absorption of heat when this chemical reaction occurs. However, ablative engines have a relatively short life span since the interior dimensions change and the nozzle wall is constantly being eroded.

A relatively new method of rocket engine cooling is in the use of an endothermic reaction in which a material is used which when subjected to high temperatures undergoes a chemical reaction. This reaction absorbs large amounts of heat thus acting as a cooling medium. An example of this can be found in U.S. Patent No. 3,067,594.

Another approach to this problem of cooling, particularly at high temperatures, has been in the spraying of molten metals such as lithium on the outer wall surfaces of the nozzle so as to take advantage of the high latent heat of vaporization as more fuly described in U.S. Patent application, Ser. No. 300,957, filed on Aug. 5, 1963, now Patent No. 3,298,175, and assigned to the assignee of this invention. This is an expensive approach and is limited to specific situations.

This invention obviates many of the disadvantages of the prior art examples enumerated above. The invention comprises a rocket engine having as its principal material of construction, beryllium. Beryllium has a high thermal-conducitvity-to-density ratio. Due to beryllium's high thermal conductivity, a heat transfer path capable of transferring large amounts of heat is formed. At the same time, the desnity is low enough such that the engine is relatively light in weight. By injecting a film of coolant adjacent the inner periphery of the combustion chamber, throat region and nozzle, heat is transferred from the hot regions adjacent the throat back toward the combustion chamber wherein the film coolant dissipates the heat. The engine is therefore capable of steady state firing.

Figure 2:
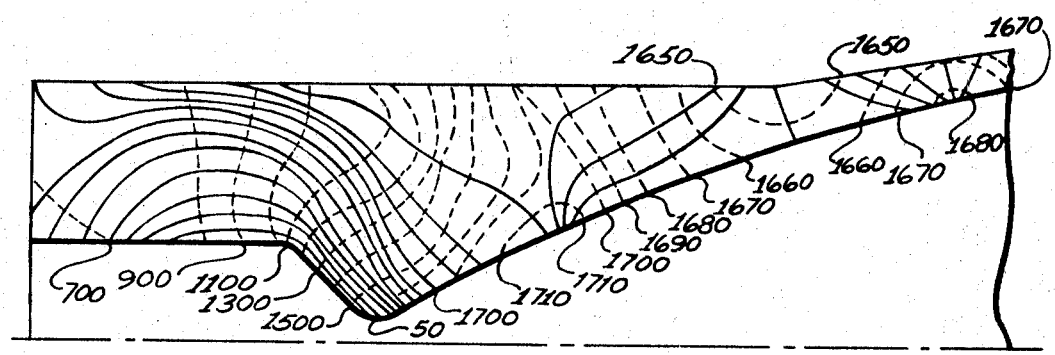
Figure 3:
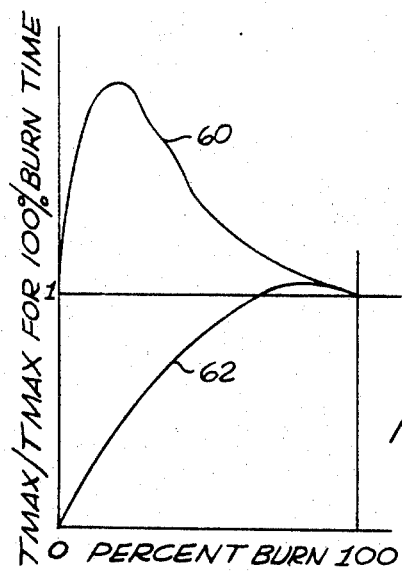
Figure 4:
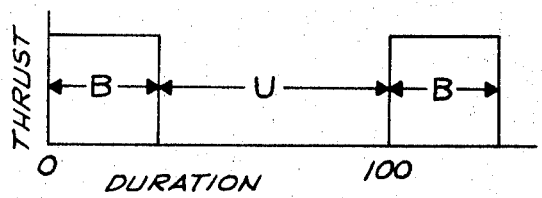

The objects and advantages of this invention will become apparent as this description proceeds taken in conjunction with the drawings in which:

FIG. 1 is a view partially in cross-section of an engine constructed according to the principles of this invention, FIG. 2 is a plot of temperature lines and heat transfer paths of a typical engine constructed according to this invention, FIG. 3 is a plot of maximum temperatures obtained divided by maximum temperatures obtained for 100 percent burn time, against percentage burn for an engine constructed according to this invention and the conventional ablative engine, and FIG. 4 is a plot of thrust against duration of firing.

Referring to FIG. 1, a cross-sectional view of a gas generating device such as a rocket engine nozzle is designated at 2 and includes a nozzle wall 4, a throat region 6 and a combustion chamber 8 formed by wall 10. Nozzle 2 is constructed of beryllium and is attached to spacer 12, insulator 20 and injector 14 by means of screws 18 which are circumferentially spaced about nozzle 2. The insulator may be constructed of a high temperature rubberized asbestos. Gaskets 17 for insulation are provided for screws 18.

A manifold ring 22 forms with injector 16 a circumferential manifold 24. Fuel is introduced by means of conduit 26 and passage 28 into manifold 24. This fuel, in turn, is injected into combustion chamber 8 through passages 30 and 32.

Oxidizer through conduit 36 and line 38 collects in a center manifold 40 and in injected into combustion chamber 8 through injector passages 42. Fuel from injector passages 30 and oxidizer from passages 42 impinge upon each other and undergo combustion. The combustion process may be initiated either by an igniter or through hypergolic ignition. The ignition process, however, forms no part of this invention. Simultaneously, with the combustion process, fuel introduced in passages 32 will travel in the direction of arrows 46 to provide film cooling of wall 10, throat 6 and nozzle wall 4.

It has been known to use film cooling in prior art examples. It has, however, not been known to provide beryllium in conjunction with film cooling such that heat flow paths are formed as more particularly brought out in FIG. 2.

FIG. 2 is a plot of isothermal lines ant heat transfer paths in a nozzle constructed of beryllium firing steady state firing. This engine was a 100 pound thrust engine which was fired long enough to achieve a steady state condition of temperatures. The dotted lines indicate the temperatures recorded and the solid lines represent the direction of heat flow. It has been known that the hottest temperatures and therefore the most critical regions in a gas generating device such as a rocket engine occur at or near the throat and slightly downstream thereof. This is indicated at 50 in FIG. 2. It has been found by applicants that by using a beryllium thrust chamber and introducing film coolant along the inner wall thereof that the heat transfer from the region adjacent and below the throat is conducted back in a direction toward the injector and then into the combustion chamber wherein the heat is dissipated by being absorbed by the film coolant.

It is noted from FIG. 2 that the maximum temperature obtained for this particular engine was in the neighborhood of 1710° F., far below beryllium's melting temperature of approximately 2340° F. Thus it can be seen that by using beryllium which has a high ratio of thermal-conductivity-to-density in conjunction with coolant flow along the inner nozzle wall that an engine cable of steady state firing is feasible.

When firing has ceased, a problem can exist through heat soaking back to the injector which is undesirable. To prevent this, insulator 20 is provided so that during shutdown after firing, transfer of heat from nozzle 2 to injector 14 is inhibited. This is particularly desirable since beryllium has a high heat sink capability. As an aid in preventing heat from being transferred to the injector passages and propellant lines, injector 16 can be constructed of beryllium which due to its high sink capability will absorb a great deal of heat without an attendant high temperature rise.

To further aid in heat dissipation, either during firing or afterwards, nozzle 2 can be constructed such that its outer area is much greater than the inner area. This provides a large radiating surface for radiation of heat. This can be accomplished by providing fins on the exterior of the nozzle or through other means known in the art.

Most small attitude control engines under present day technology include ablative chambers. The operation of these engines typically comprises a duty cycle wherein the engine is designed for a given burnout time which may be expressed in terms of percent. For example, an ablative engine may have a burnout time of 100 seconds for full duration firing. Usually, however, the engines do not fire for this full length of time but are fired only in bursts or pulses depending on the mission requirements.

FIG. 4 is a graph of thrust versus duration of burn time expressed in percent. The portion designated by B represents full thrust whereas a portion designated by U represents the time during a given duty cycle when the engine is not firing. The percent of burn time can be expressed by the following equation:

$$\text{Percent burn} = \frac{B}{B+U} \times 100$$

It has been found that in the use of ablative engines, when the engine is fired for less than its full duration (100 percent burn time), the maximum temperature in the engine is greater than the maximum temperature at 100 percent burn time. A typical burn time for ablative engines is in the neighborhood of 20 percent which happens to coincide with the maximum temperature obtained as shown in FIG. 4. The plot of maximum temperature versus the meximum temperature for 100 percent burn time for an ablative engine is shown as line 60· The maximum temperature divided by the maximum temperature for 100 percent burn for the engine constructed according to this invention is shown at line 62. Thus, it can be seen that the maximum temperature obtained for engines constructed according to this invention is less by far of an ablative engine. Another way of expressing this is in terms of efficiency rating. The ratio of the maximum temperature divided by the maximum temperature for 100 percent burning is a reverse indication of the efficiency rating. Thus, for low percent burn times the instant invention is more efficient than the conventional ablative chamber.

Thus it can be seen that through the use of beryllium which has a high thermal conductivity to density ratio, in conjunction with film cooling along the nozzle wall, that an engine which operates at any selected burn time as well as full duration is provided which has a high efficiency rating as compared with the conventional ablative engine. Also, this engine has a theoretical duration which surpasses that of any other known engine except the regenerative cooling system which is difficult to operate in the pulse mode. The pulse mode may be described as intermittent firing and shut down.

Having described this invention with particularity, it is to be understood that the scope of the invention is to be limited only by the claims appended hereto.

We claim:
1. A primary cooling system for cooling a gas generator comprising:

a gas generator having a combustion chamber and nozzle joined by a throat portion, the combustion chamber and throat portion being constructed from beryllium.

an injector for injecting propellant into the combustion chamber.

means for supplying a film of coolant fluid to the interior wall of the combustion chamber.

the walls of the combustion chamber and throat portion being of beryllium metal and of sufficient thickness so that when the film of coolant is being supplied heat paths are formed within the walls, the heat paths extending from the throat portion axially rearwardly to a region upstream of the throat portion adjacent said interior wall, said walls acting as a heat sink to dissipate heat removed from throat portion.

2. The structure according to claim 1 wherein an insulator is provided between said combustion chamber wall and said injector to inhibit heat soak back from said combustion chamber to said injector after firing of said gas generator.

3. The structure according to claim 1 wherein said injector is constructed of beryllium.

4. The structure according to claim 1 wherein the outside area of said gas generator wall is substantially larger than the inside area of said gas generator wall.

References Cited

UNITED STATES PATENTS

| | | | |
|---|---|---|---|
| 2,705,399 | 4/1955 | Allen | 60—39.66 |
| 3,354,651 | 11/1967 | Novotny | 60—258 |
| 2,744,380 | 5/1956 | McMillan | 60—39.48 |
| 2,902,823 | 9/1959 | Wagner | 60—39.69 |
| 3,000,184 | 9/1961 | Fish | 60—258 |
| 3,309,026 | 3/1967 | Loprete | 60—263 |

OTHER REFERENCES

Judge, J. F. "Non-Eroding Nozzle," Missiles and Rockets, Dec. 14, 1964, pages 22 and 23 relied on.

MARTIN P. SCHWADRON, *Primary Examiner.*

DOUGLAS HART, *Assistant Examiner.*

U.S. Cl. X.R.

60—258.